US009064484B1

(12) United States Patent
Jääskeläinen et al.

(10) Patent No.: US 9,064,484 B1
(45) Date of Patent: Jun. 23, 2015

(54) METHOD OF PROVIDING FEEDBACK ON PERFORMANCE OF KARAOKE SONG

(71) Applicant: SINGON, Oulu (FI)

(72) Inventors: Petri Jääskeläinen, Oulu (FI); Tommi Halonen, Oulu (FI)

(73) Assignee: SINGON OY, Oulu (FI)

( * ) Notice: Subject to any disclaimer, the term of this patent is extended or adjusted under 35 U.S.C. 154(b) by 0 days.

(21) Appl. No.: 14/215,892

(22) Filed: Mar. 17, 2014

(51) Int. Cl.

| | |
|---|---|
| ***G10H 1/00*** | (2006.01) |
| ***G09B 15/00*** | (2006.01) |
| ***G09B 15/02*** | (2006.01) |
| ***G10H 1/36*** | (2006.01) |

(52) U.S. Cl.
CPC .................................... *G10H 1/361* (2013.01)

(58) Field of Classification Search
CPC ........... G10H 2210/091; G10H 1/368; G10H 2220/135; G10H 2210/066; G10H 2220/011
USPC ........................................ 434/307 A; 84/600
See application file for complete search history.

(56) References Cited

U.S. PATENT DOCUMENTS

| | | | | |
|---|---|---|---|---|
| 5,889,224 | A * | 3/1999 | Tanaka | 84/645 |
| 6,147,291 | A * | 11/2000 | Matsumoto | 84/611 |
| 6,582,235 | B1 * | 6/2003 | Tsai et al. | 434/307 A |
| 6,838,608 | B2 * | 1/2005 | Koike | 84/477 R |
| 2003/0003431 | A1 * | 1/2003 | Maeda | 434/307 A |
| 2009/0284950 | A1 * | 11/2009 | Rubio et al. | 362/86 |
| 2010/0169085 | A1 * | 7/2010 | Ranga Rao et al. | 704/207 |
| 2010/0192753 | A1 * | 8/2010 | Gao et al. | 84/610 |
| 2010/0300270 | A1 * | 12/2010 | Applewhite et al. | 84/610 |
| 2010/0304863 | A1 * | 12/2010 | Applewhite et al. | 463/36 |
| 2011/0146478 | A1 * | 6/2011 | Andrews et al. | 84/611 |

* cited by examiner

*Primary Examiner* — Jeffrey Donels
(74) *Attorney, Agent, or Firm* — Ziegler IP Law Group, LLC

(57) ABSTRACT

A method and system for providing a feedback on a performance of a karaoke song is provided. Musical data elements of a music track input feed are compared with musical data elements of a performance input feed. Based on the comparison, the feedback on the performance of the karaoke song is generated on a display. Accordingly, lyrical data elements of a music track of the karaoke song and lyrical data elements of the performance are represented on the display. Moreover, differences between the performance and the music track are represented by altering the representation of the lyrical data elements of the performance relative to the representation of the lyrical data elements of the music track on the display.

29 Claims, 9 Drawing Sheets

METHOD OF PROVIDING FEEDBACK ON PERFORMANCE OF KARAOKE SONG

TECHNICAL FIELD

The aspects of the present disclosure generally relates to karaoke systems, and more specifically, to providing feedback on performance of a karaoke song on a display device.

BACKGROUND

Sheet music is typically used for describing music accurately. However, only trained musicians can read and interpret sheet music. Therefore, it is desirable to simplify a representation of music, so that music hobbyists can use the simplified representation of music to perform to their favourite songs.

Conventionally, a karaoke system provides a simplified expression or representation of a song or music, generally described herein as a karaoke song. Such a simplified representation typically provides a user with three separate elements as follows:

(i) lyrics of the karaoke song,
(ii) variations in a pitch and a tempo of the karaoke song, and
(iii) a feedback on a user's performance.

As a result, the conventional karaoke system is inconvenient to the user, as the user has to focus on these separate elements, namely, reading the lyrics, following the pitch and the tempo of the karaoke song, and following the feedback.

Moreover, the conventional karaoke system does not provide any indication on dynamics of the karaoke song. Consequently, the performance of the user often turns out to be flat.

Therefore, there exists a need for a method of providing a user with feedback on performance of a karaoke song that is capable of enhancing the user's karaoke experience.

SUMMARY

In one aspect, embodiments of the present disclosure provide a method of providing feedback on a performance of a karaoke song on a display device. In one embodiment, musical data elements are extracted from a music track input feed corresponding to a music track of the karaoke song. The music track input feed includes one or more of: audio data, musical data, song metadata, sensory data, video data, and/or contextual information.

The musical data elements of the music track input feed include one or more of: lyrical data elements, vocal data elements, instrumental data elements, and/or structural data elements.

Subsequently, a visual representation of the music track of the karaoke song is created on a display of the display device. The visual representation is at least partially based on the musical data elements of the music track input feed. Thus, the visual representation includes a combination of two or more of: the lyrical data elements, the vocal data elements, the instrumental data elements, and/or the structural data elements.

Likewise, musical data elements are extracted from a performance input feed corresponding to the performance of the karaoke song. The musical data elements of the performance input feed include one or more of: lyrical data elements, vocal data elements, instrumental data elements, and/or structural data elements.

Subsequently, a comparison is made between the musical data elements of the music track input feed and the musical data elements of the performance input feed. Based on the comparison, the feedback on the performance of the karaoke song is generated on the display of the display device.

Accordingly, the lyrical data elements of the music track and the lyrical data elements of the performance are represented on the display of the display device. Beneficially, the lyrical data elements of the performance are positioned relative to corresponding lyrical data elements of the music track on the display.

Moreover, differences between the performance of the karaoke song and the music track of the karaoke song are represented by altering the representation of the lyrical data elements of the performance relative to the representation of the lyrical data elements of the music track on the display.

Optionally, a vertical position of a lyrical data element of the music track relative to a horizontal axis of the display corresponds to a pitch of the music track. Likewise, a vertical position of a lyrical data element of the performance relative to the horizontal axis of the display corresponds to a pitch of the performance.

Consequently, a difference between the pitch of the performance and the pitch of the music track is represented by a difference between the vertical position of a lyrical data element of the performance and the vertical position of a corresponding lyrical data element of the music track on the display. In an embodiment, the vertical position of the lyrical data element of the performance is lower than the vertical position of the corresponding lyrical data element of the music track, when the pitch of the performance is lower than the pitch of the music track. On the other hand, the vertical position of the lyrical data element of the performance is higher than the vertical position of the corresponding lyrical data element of the music track, when the pitch of the performance is higher than the pitch of the music track.

Optionally, a difference between a tempo of the performance and a tempo of the music track is represented by a difference between a horizontal position of a lyrical data element of the performance on the display and a horizontal position of a corresponding lyrical data element of the music track on the display.

Optionally, a size of a lyrical data element of the music track corresponds to a loudness of the music track. Likewise, a size of a lyrical data element of the performance corresponds to a loudness of the performance.

Consequently, a difference between the loudness of the performance and the loudness of the music track is represented by a difference between the size of a lyrical data element of the performance and the size of a corresponding lyrical data element of the music track on the display.

Optionally, the lyrical data elements of the performance are overlaid on the corresponding lyrical data elements of the music track on the display. A vertical difference in a position of the lyrical data elements of the performance overlaid on the corresponding lyrical data elements of the music track represents a pitch difference. A difference in a size of the lyrical data elements of the performance overlaid on the corresponding lyrical data elements of the music track represents a difference in a volume level.

Optionally, the lyrical data elements of the music track and the lyrical data elements of the performance are textual elements.

Optionally, a font type and a colour of a lyrical data element of the music track correspond to an articulation style of the music track. Likewise, a font type and a colour of a lyrical data element of the performance correspond to an articulation style of the performance.

Consequently, a difference between the articulation style of the performance and the articulation style of the music track is represented by a difference between the font type and the colour of a lyrical data element of the performance and the font type and the colour of a corresponding lyrical data element of the music track.

Moreover, a graphical indicator is optionally moved horizontally across the display of the display device relative to the lyrical data elements of the music track. The graphical indicator indicates a part of lyrics of the music track to be sung by a user. Thus, a speed of movement of the graphical indicator is beneficially synchronized with the tempo of the music track.

In another aspect, embodiments of the present disclosure provide a system including a memory, a processor coupled to the memory and a display coupled to the processor, wherein the processor is configured to perform one or more aspects of the aforementioned method.

In yet another aspect, embodiments of the present disclosure provide a software product recorded on machine-readable non-transient data storage media, wherein the software product is executable upon computing hardware for implementing the aforementioned method.

Embodiments of the present disclosure substantially eliminate, or at least partially address, the aforementioned problems in the prior art, and provide a feedback on a performance of a karaoke song in substantially real-time; and facilitate a single, holistic representation of the performance of the karaoke song, thereby providing an enhanced karaoke experience to a user.

Additional aspects, advantages and features of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
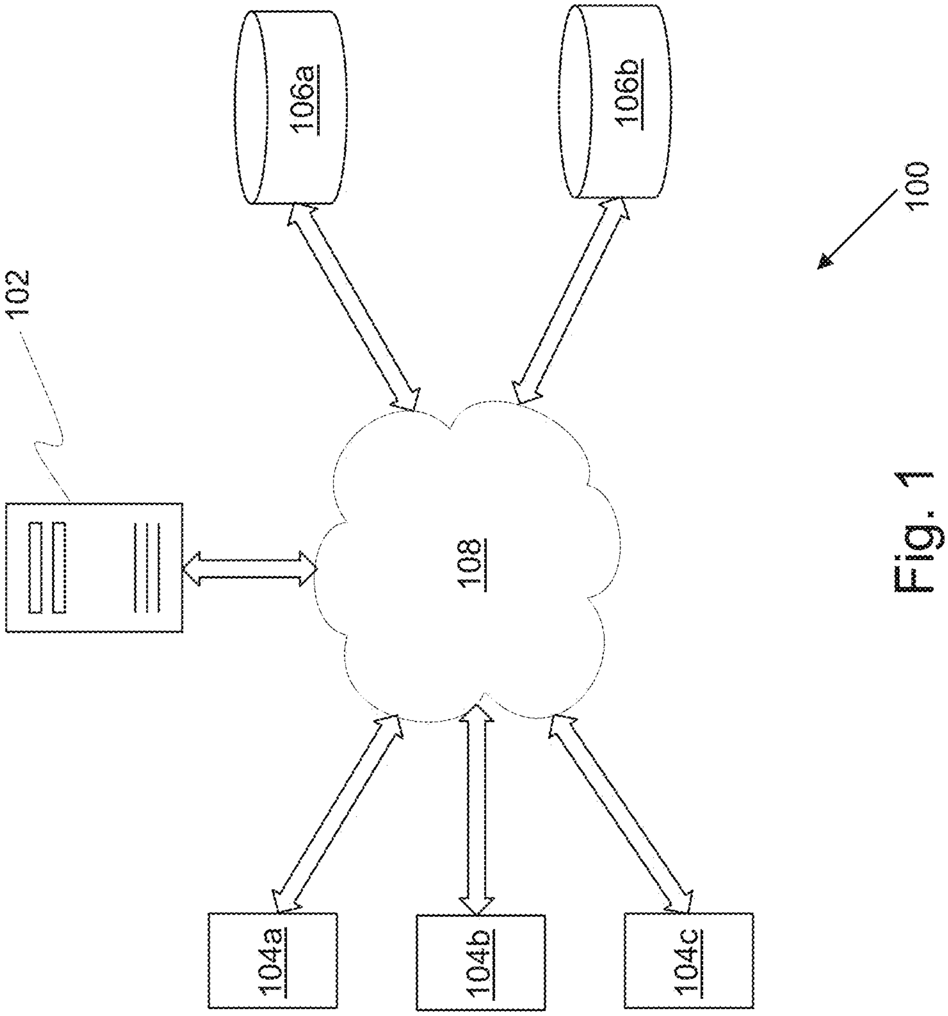
FIG. 1 is a schematic illustration of a system for providing a feedback on a performance of a karaoke song, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Embodiments of the present disclosure provide a method of providing a feedback on a performance of a karaoke song on a display device. Musical data elements are extracted from a music track input feed corresponding to a music track of the karaoke song. The music track input feed includes one or more of: audio data, musical data, song metadata, sensory data, video data, and/or contextual information.

The musical data elements of the music track input feed include lyrical data elements and vocal data elements. Additionally, these musical data elements optionally include instrumental data elements and structural data elements.

Subsequently, a visual representation of the music track of the karaoke song is created on a display of the display device. The visual representation is at least partially based on the musical data elements of the music track input feed. Thus, the visual representation includes a combination of two or more of: the lyrical data elements, the vocal data elements, the instrumental data elements, and/or the structural data elements.

Likewise, musical data elements are extracted from a performance input feed corresponding to the performance of the karaoke song. The musical data elements of the performance input feed include lyrical data elements and vocal data elements. Additionally, these musical data elements optionally include instrumental data elements and structural data elements.

Subsequently, a comparison is made between the musical data elements of the music track input feed and the musical data elements of the performance input feed. Based on the comparison, the feedback on the performance of the karaoke song is generated on the display of the display device.

Accordingly, the lyrical data elements of the music track and the lyrical data elements of the performance are represented on the display of the display device. Beneficially, the lyrical data elements of the performance are positioned relative to corresponding lyrical data elements of the music track on the display.

Moreover, differences between the performance of the karaoke song and the music track of the karaoke song are represented by altering the representation of the lyrical data elements of the performance relative to the representation of the lyrical data elements of the music track on the display.

Optionally, a vertical position of a lyrical data element of the music track relative to a horizontal axis of the display corresponds to a pitch of the music track. Likewise, a vertical position of a lyrical data element of the performance relative to the horizontal axis of the display corresponds to a pitch of the performance.

Consequently, a difference between the pitch of the performance and the pitch of the music track is represented by a difference between the vertical position of a lyrical data element of the performance and the vertical position of a corresponding lyrical data element of the music track on the display. In an embodiment, the vertical position of the lyrical data element of the performance is lower than the vertical position of the corresponding lyrical data element of the music track, when the pitch of the performance is lower than the pitch of the music track. On the other hand, the vertical position of the lyrical data element of the performance is higher than the vertical position of the corresponding lyrical data element of the music track, when the pitch of the performance is higher than the pitch of the music track.

Optionally, a difference between a tempo of the performance and a tempo of the music track is represented by a difference between a horizontal position of a lyrical data element of the performance on the display and a horizontal position of a corresponding lyrical data element of the music track on the display.

Optionally, a size of a lyrical data element of the music track corresponds to a loudness of the music track. Likewise, a size of a lyrical data element of the performance corresponds to a loudness of the performance.

Consequently, a difference between the loudness of the performance and the loudness of the music track is represented by a difference between the size of a lyrical data element of the performance and the size of a corresponding lyrical data element of the music track on the display.

Optionally, the lyrical data elements of the performance are overlaid on the corresponding lyrical data elements of the music track on the display. A vertical difference in a position of the lyrical data elements of the performance overlaid on the corresponding lyrical data elements of the music track represents a pitch difference. A difference in a size of the lyrical data elements of the performance overlaid on the corresponding lyrical data elements of the music track represents a difference in a volume level.

Optionally, the lyrical data elements of the music track and the lyrical data elements of the performance are textual elements.

Optionally, a font type and a colour of a lyrical data element of the music track correspond to an articulation style of the music track. Likewise, a font type and a colour of a lyrical data element of the performance correspond to an articulation style of the performance.

Consequently, a difference between the articulation style of the performance and the articulation style of the music track is represented by a difference between the font type and the colour of a lyrical data element of the performance and the font type and the colour of a corresponding lyrical data element of the music track.

Moreover, a graphical indicator is optionally moved horizontally across the display of the display device relative to the lyrical data elements of the music track. The graphical indicator indicates a part of lyrics of the music track to be sung by a user. Thus, a speed of movement of the graphical indicator is beneficially synchronized with the tempo of the music track.

Referring now to the drawings, particularly by their reference numbers, FIG. 1 is a schematic illustration of a system 100 for providing a feedback on a performance of a karaoke song, in accordance with an embodiment of the present disclosure. The system 100 includes a server arrangement 102 and one or more display devices, depicted as a display device 104*a*, a display device 104*b* and a display device 104*c* in FIG. 1 (hereinafter collectively referred to as display devices 104). The system 100 also includes one or more databases, depicted as a database 106*a* and a database 106*b* in FIG. 1 (hereinafter collectively referred to as databases 106). The databases 106 are optionally associated with the server arrangement 102.

The system 100 may be implemented in various ways, depending on various possible scenarios. In one example, the system 100 may be implemented by way of a spatially collocated arrangement of the server arrangement 102 and the databases 106. In another example, the system 100 may be implemented by way of a spatially distributed arrangement of the server arrangement 102 and the databases 106 coupled mutually in communication via a communication network 108, for example, as shown in FIG. 1. In yet another example, the server arrangement 102 and the databases 106 may be implemented via cloud computing services.

The communication network 108 couples the server arrangement 102 to the display devices 104, and provides a communication medium between the server arrangement 102 and the display devices 104 for exchanging data amongst themselves. It is to be noted here that the display devices 104 need not be temporally simultaneously coupled to the server arrangement 102, and can be coupled to the server arrangement 102 at any time, independent of each other.

The communication network 108 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Examples of the display devices 104 include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, large-sized touch screens with embedded PCs, and interactive entertainment devices, such as karaoke devices, game consoles, Television (TV) sets and Set-Top Boxes (STBs).

The display devices 104 access various services provided by the server arrangement 102. In order to access the various services provided by the server arrangement 102, each of the display devices 104 optionally employs a software product that provides a user interface to a user associated with that display device. The software product may be a native software application, a software application running on a browser, or a plug-in application provided by a website, such as a social networking website.

In one embodiment, the system 100 is arranged in a manner that its functionality is implemented partly in the server arrangement 102 and partly in the display devices 104.

In another embodiment, the system 100 is arranged in a manner that its functionality is implemented substantially in the display devices 104 by way of one or more native software applications. In such a situation, the display devices 104 may be coupled to the server arrangement 102 periodically or randomly from time to time, for example, to receive updates from the server arrangement 102 and/or to receive music track input feeds corresponding to music tracks of karaoke songs.

In yet another embodiment, the system 100 is arranged in a manner that its functionality is implemented substantially in the server arrangement 102.

In an example, the system 100 enables a user associated with a given display device to perform one or more of following:

search for and/or browse through one or more karaoke lists to select a karaoke song to perform;

perform the karaoke song;

view lyrics and other musical notations, during a performance of the karaoke song; and/or view feedback on the performance of the karaoke song in substantially real time.

In one embodiment, the server arrangement 102 is operable to extract musical data elements from a music track input feed corresponding to a music track of the karaoke song. The music track input feed includes one or more of: audio data, musical data, song metadata, sensory data, video data, and/or contextual information pertaining to the music track of the karaoke song. Optionally, the music track input feed is stored in at least one of the databases 106.

The audio data may, for example, be provided in a suitable audio format. In one example, the audio data is provided as an audio file. In another example, the audio data is provided as a streaming music.

The musical data optionally includes one or more of: lyrics, a tempo, a vocal pitch, a melody pitch, a rhythm, dynamics, and/or musical notations of the music track of the karaoke song. Moreover, the musical notations may, for example, include sheet music, tablature and/or other similar notations used to represent aurally perceived music.

Additionally, the musical data optionally includes synchronization information required for synchronizing various aspects of the music track.

In an example, the musical data is provided as a Musical Instrument Digital Interface (MIDI) file. In another example, the musical data is optionally extracted from an audio of, or audio track corresponding to, the karaoke song and analyzed, using signal processing algorithms.

The song metadata optionally includes one or more of: a musical genre to which the karaoke song belongs, names of one or more artists who originally created the music track of the karaoke song, genders of the one or more artists, a language of the karaoke song, and/or a year of publication of the karaoke song. In an example, the song metadata is provided as a file. In another example, the song metadata is accessed from a database. In yet another example, the song metadata is provided by an external system.

The sensory data optionally includes movements of the one or more artists. The video data optionally includes facial expressions of the one or more artists.

The movements and/or the facial expressions of the one or more artists are optionally extracted from a video of the karaoke song and analyzed, using signal processing algorithms. Such an analysis is beneficially used to determine how the one or more artists empathize with music of the music track.

The contextual information optionally includes one or more of: a location where the music track was created, a time and/or a date when the music track was created.

As a result, the musical data elements of the music track input feed include lyrical data elements and vocal data elements of the music track. Additionally, these musical data elements optionally include instrumental data elements and structural data elements of the music track.

The lyrical data elements of the music track optionally include one or more of:

raw words and phrases of the lyrics;

semantics of the lyrics;

emotional keywords occurring in the lyrics, such as love and hate;

slang terms occurring in the lyrics, such as yo, go, rock and run;

repeating words and phrases of the lyrics;

chorus and verse; and/or onomatopoetic or phonetic pseudo words, such as uuh, aah and yeehaaw.

The vocal data elements of the music track optionally include one or more of: the vocal pitch, the melody pitch, the tempo, the rhythm, the dynamics, the volume, and/or an articulation style of the music track of the karaoke song. The articulation style may, for example, include whispering, shouting, falsetto, legato, staccato, rap, and so on.

The instrumental data elements of the music track optionally include one or more of a music style of the music track, such as classical, rock, and rap;

a tempo of different instruments; and/or beat highlights, such as drum and bass.

The structural data elements of the music track optionally include one or more of: an intro, an outro, a chorus, a verse, an instrumental break, and/or a vocalist-only section.

Moreover, the musical data elements of the music track input feed are optionally stored in at least one of the databases 106.

Figure 3A:
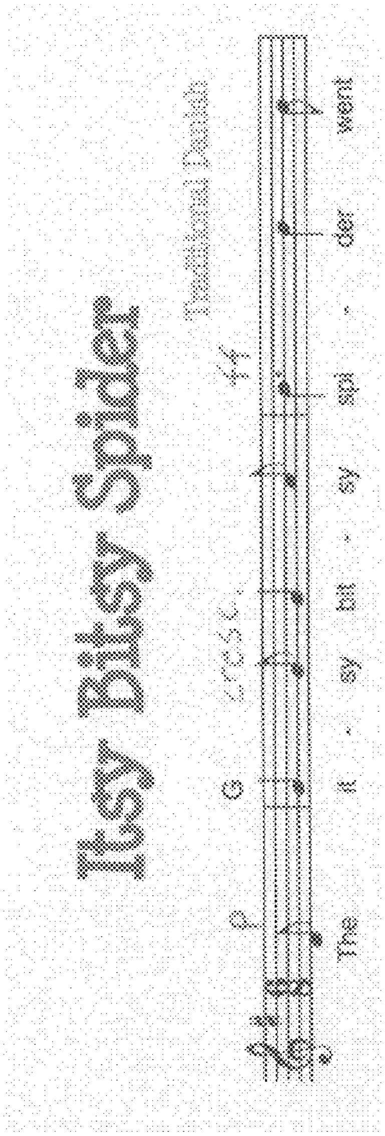
FIGS. 3A, 3B and 3C collectively are an example illustration of a music track input feed corresponding to a music track of a karaoke song, and musical data elements extracted therefrom, in accordance with an embodiment of the present disclosure.
Figure 3B:
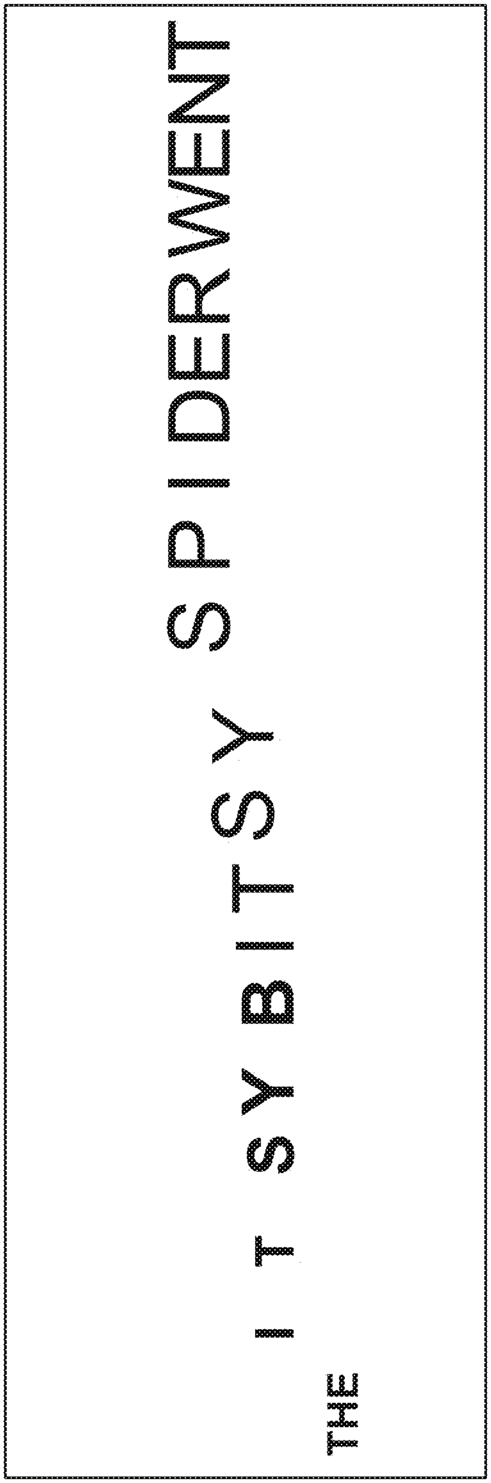
Figure 3C:
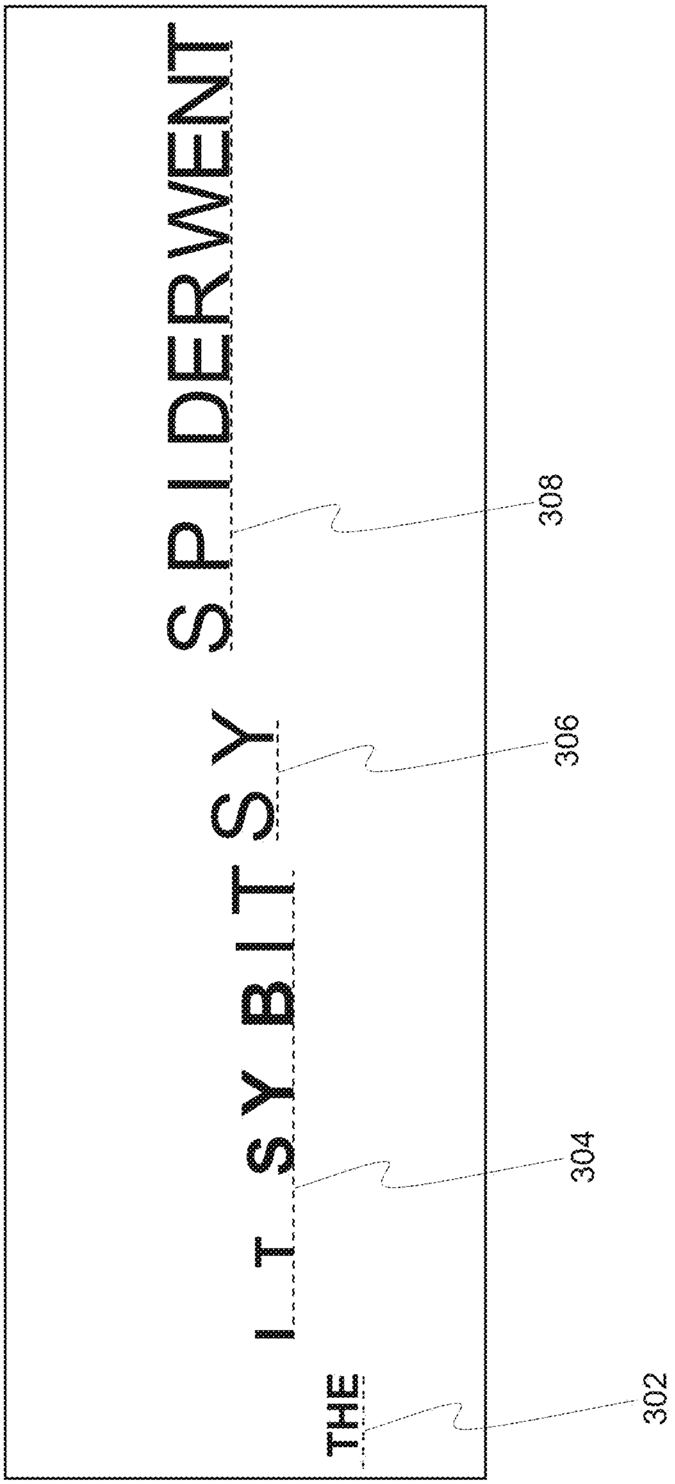

An example of a music track input feed and musical data elements extracted therefrom has been provided in conjunction with FIGS. 3A, 3B and 3C.

Furthermore, upon receiving a request from the given display device, the server arrangement 102 provides the given display device with the musical data elements of the music track input feed. Subsequently, a visual representation of the music track of the karaoke song is created on a display of the given display device.

The visual representation is at least partially based on the musical data elements of the music track input feed. Thus, the visual representation includes a combination of two or more of: the lyrical data elements, the vocal data elements, the instrumental data elements, and/or the structural data elements.

When the user performs the karaoke song, the given display device is optionally operable to extract musical data elements from a performance input feed corresponding to the user's performance of the karaoke song. The performance input feed includes one or more of: audio data, musical data, sensory data, and/or video data pertaining to the performance of the karaoke song.

The given display device employs a microphone for receiving an audio of the user's performance. The given display device is operable to analyze the audio of the user's performance, using the signal processing algorithms. The given display device is then operable to extract the audio data and the musical data of the performance input feed, based upon the analysis of the audio.

Consequently, the musical data of the performance input feed optionally includes one or more of: lyrics, a tempo, a vocal pitch, a melody pitch, and/or dynamics of the user's performance of the karaoke song.

Additionally, the given display device optionally employs a camera for receiving the video data and/or the sensory data of the performance input feed.

The performance input feed is optionally analyzed using the signal processing algorithms. Consequently, the musical data elements of the performance input feed include lyrical data elements and vocal data elements of the performance. Additionally, these musical data elements optionally include instrumental data elements and structural data elements of the performance.

Subsequently, a comparison is made between the musical data elements of the music track input feed and the musical data elements of the performance input feed. The comparison may, for example, be made using the signal processing algorithms.

Based on the comparison, the feedback on the performance of the karaoke song is generated on the display of the given display device.

Accordingly, the lyrical data elements of the music track and the lyrical data elements of the performance are represented on the display of the given display device. Beneficially, the lyrical data elements of the performance are positioned relative to corresponding lyrical data elements of the music track on the display.

Moreover, differences between the performance of the karaoke song and the music track of the karaoke song are represented by altering the representation of the lyrical data elements of the performance relative to the representation of the lyrical data elements of the music track on the display. Details of how these differences may be represented have been provided in conjunction with FIGS. 4, 5A and 5B.

FIG. 1 is merely an example, which should not unduly limit the scope of the claims herein. It is to be understood that the specific designation for the system 100 is provided as an example and is not to be construed as limiting the system 100 to specific numbers, types, or arrangements of display devices, server arrangements, and databases. A person skilled in the art will recognize many variations, alternatives, and modifications of embodiments of the present disclosure.

Figure 2:
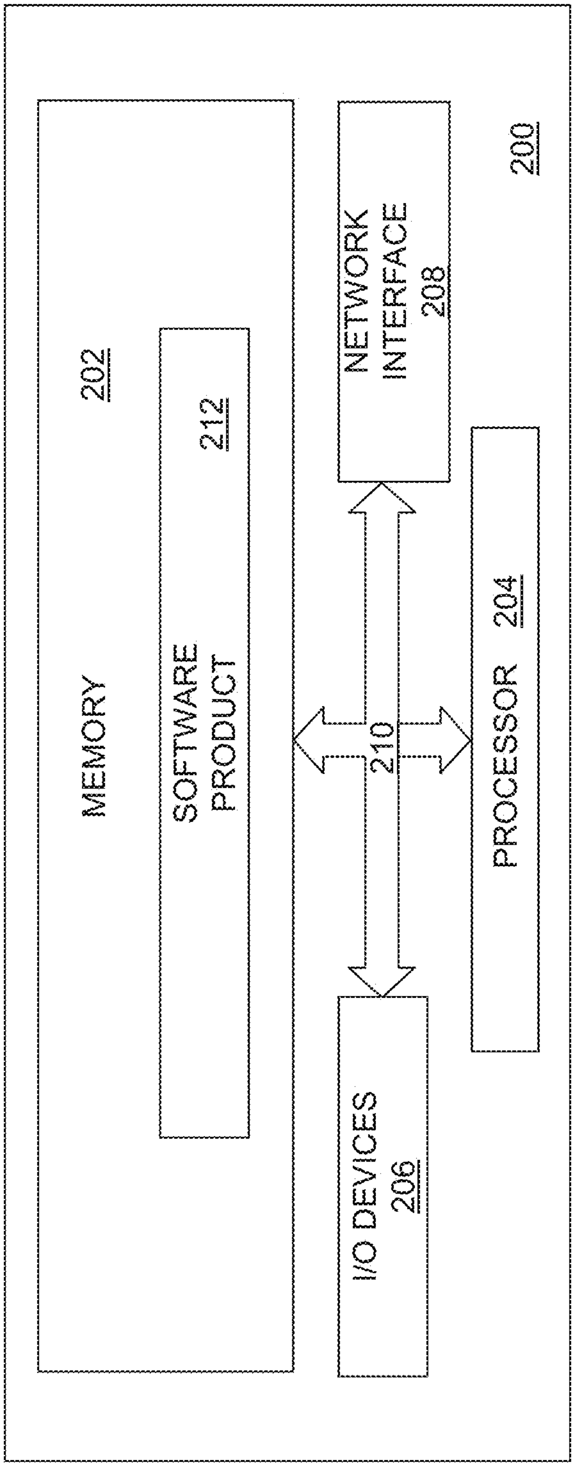
FIG. 2 is a schematic illustration of various components in an example implementation of a display device, in accordance with an embodiment of the present disclosure.

FIG. 2 is a schematic illustration of various components in an example implementation of a display device 200, in accordance with an embodiment of the present disclosure. The display device 200 could be implemented in a manner that is similar to the implementation of the display devices 104 as described in conjunction with FIG. 1. Moreover, each of the display devices 104 could be implemented in a manner that is similar to the example implementation of the display device 200.

The display device 200 includes, but is not limited to, a data memory 202, a processor 204, Input/Output (I/O) devices 206, a network interface 208 and a system bus 210 that operatively couples various components including the data memory 202, the processor 204, the I/O devices 206 and the network interface 208.

Moreover, the display device 200 optionally includes a data storage (not shown in FIG. 2). The data storage optionally stores one or more karaoke songs and corresponding music track input feeds. Additionally or alternatively, the data storage optionally stores musical data elements of the corresponding music track input feeds, namely, musical data elements extracted from the corresponding music track input feeds.

The display device 200 also includes a power source (not shown in FIG. 2) for supplying electrical power to the various components of the display device 200. The power source may, for example, include a rechargeable battery.

The data memory 202 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The data memory 202 stores a software product 212, while the processor 204 is operable to execute the software product 212. The software product 212 may be a native software application, a software application running on a browser, or a plug-in application provided by a website, such as a social networking website.

Executing the software product 212 on the processor 204 results in generation of a user interface on a display of the display device 200. The user interface is optionally configured to facilitate user's interactions, for example, with the system 100.

Beneficially, the I/O devices 206 include the display for providing the user interface, a speaker and/or a headphone for providing an audio output to the user, and a microphone for receiving an audio input from the user.

Beneficially, the microphone is employed to receive an audio of user's performance of a karaoke song. When executed on the processor 204, the software product 212 is configured to analyze the audio of the user's performance to extract audio data and/or musical data corresponding to the user's performance.

Additionally, the I/O devices 206 optionally include a camera that is employed to receive video data and/or sensory data corresponding to the user's performance of the karaoke song.

When executed on the processor 204, the software product 212 is configured to perform operations as described in conjunction with FIG. 1. Accordingly, the software product 212, when executed on the processor 204, is configured to perform one or more of:

(i) extract musical data elements from a music track input feed corresponding to a music track of a karaoke song;

(ii) create a visual representation of the music track of the karaoke song;

(iii) extract musical data elements from a performance input feed corresponding to a performance of the karaoke song;

(iv) compare the musical data elements of the music track input feed with the musical data elements of the performance input feed;

(v) generate a feedback on the performance of the karaoke song, based on the comparison;

(vi) represent lyrical data elements of the music track and lyrical data elements of the performance on the display; and/or (vii) represent differences between the performance and the music track by altering representations of their respective lyrical data elements relative to each other.

Figure 4:
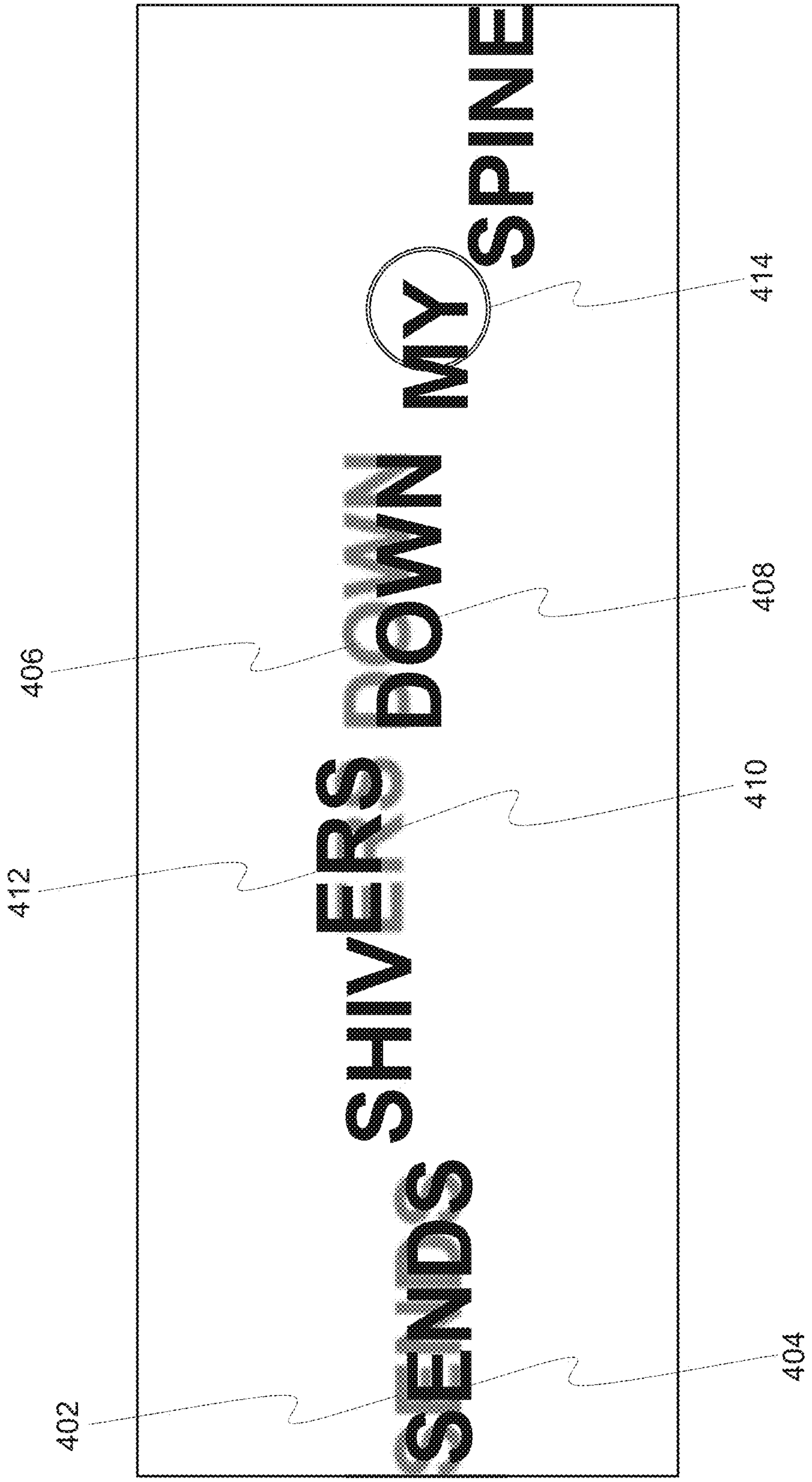
FIG. 4 is an example illustration of how a feedback can be provided to a user, in accordance with an embodiment of the present disclosure.
Figure 5A:
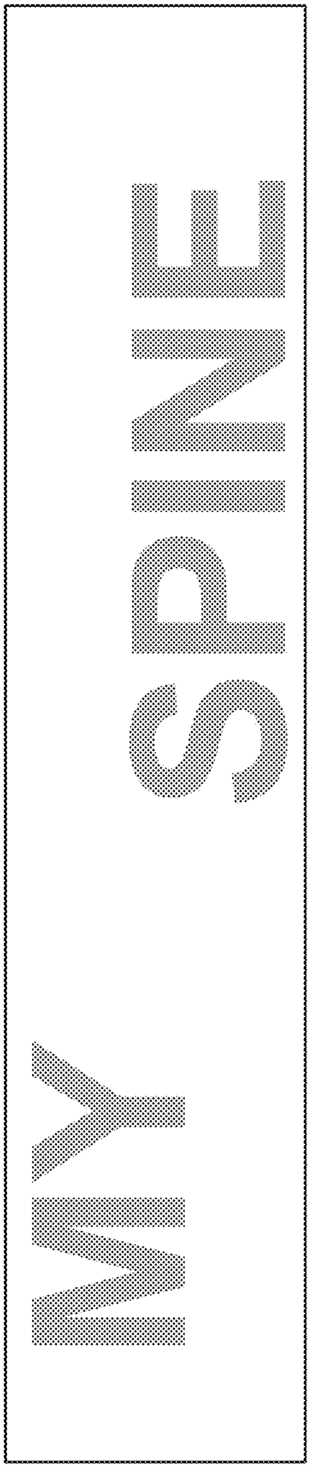
FIGS. 5A and 5B collectively are another example illustration of how a feedback can be provided to a user, in accordance with an embodiment of the present disclosure.
Figure 5B:
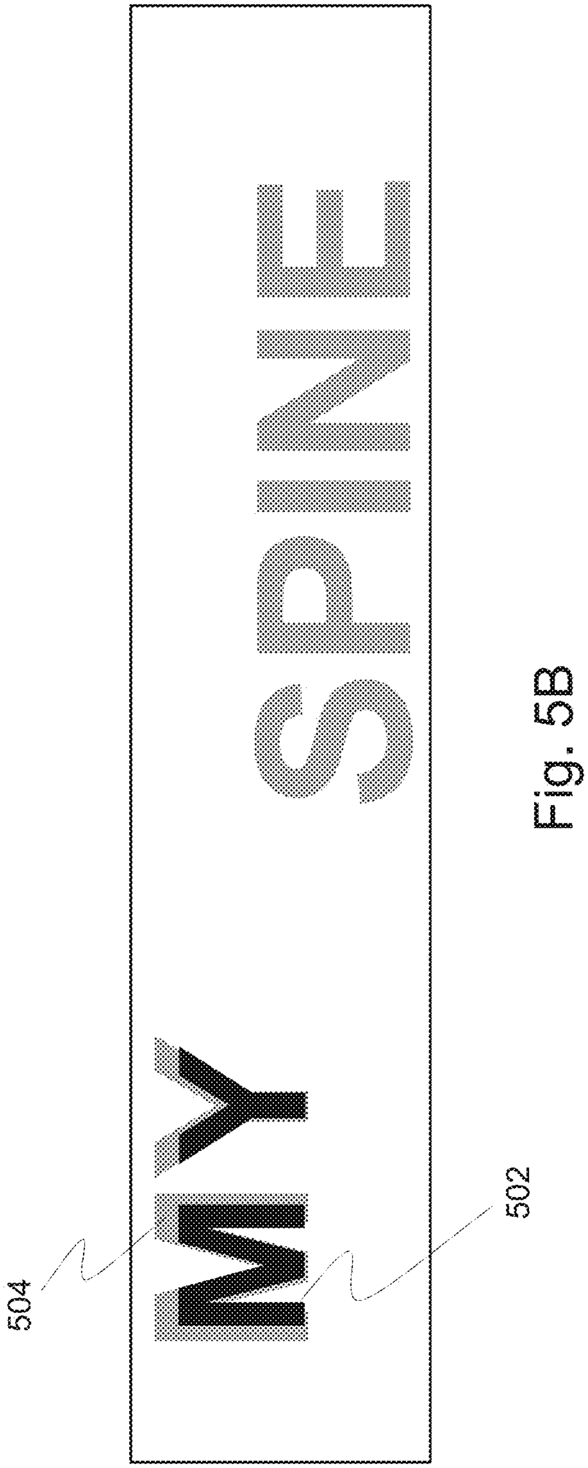

Details of how these differences may be represented have been provided in conjunction with FIGS. 4, 5A and 5B.

Beneficially, the feedback is generated in substantially real time.

Moreover, the network interface 208 optionally allows the display device 200 to communicate with a server arrangement, such as the server arrangement 102, via a communication network. The communication network may, for example, be a collection of individual networks, interconnected with each other and functioning as a single large network. Such individual networks may be wired, wireless, or a combination thereof. Examples of such individual networks include, but are not limited to, LANs, WANs, MANs, WLANs, WWANs, WMANs, 2G telecommunication networks, 3G telecommunication networks, 4G telecommunication networks, and WiMAX networks.

The display device 200 is optionally implemented by way of at least one of: a mobile phone, a smart telephone, an MID, a tablet computer, a UMPC, a phablet computer, a PDA, a web pad, a PC, a handheld PC, a laptop computer, a desktop computer, a large-sized touch screen with an embedded PC, and/or an interactive entertainment device, such as a karaoke device, a game console, a TV set and an STB.

FIG. 2 is merely an example, which should not unduly limit the scope of the claims herein. It is to be understood that the specific designation for the display device 200 is provided as an example and is not to be construed as limiting the display device 200 to specific numbers, types, or arrangements of modules and/or components of the display device 200. A person skilled in the art will recognize many variations, alternatives, and modifications of embodiments of the present disclosure.

FIGS. 3A, 3B and 3C collectively are an example illustration of a music track input feed corresponding to a music track of a karaoke song, and musical data elements extracted therefrom, in accordance with an embodiment of the present disclosure.

FIG. 3A shows an example piece of sheet music. This example piece of sheet music corresponds to a first row of sheet music pertaining to a children song “Itsy Bitsy Spider”.

The example piece of sheet music defines one or more of: a tempo, a rhythm, a pitch, dynamics and/or lyrics of a music track of the children song “Itsy Bitsy Spider”. Beneficially, the example piece of sheet music acts as a music track input feed for the system 100.

The system 100 is optionally operable to analyze the example piece of sheet music to extract musical data elements of the music track input feed. The musical data elements of the music track input feed include lyrical data elements and vocal data elements of the music track. Additionally, these musical data elements optionally include instrumental data elements and structural data elements of the music track.

Subsequently, the system 100 is optionally operable to create a visual representation of the music track, based at least partially on the musical data elements of the music track input feed.

FIG. 3B shows the visual representation corresponding to the example piece of sheet music. The lyrical data elements of the music track are depicted as textual elements, as shown in FIG. 3B. The textual elements may, for example, include words, phrases, syllables, characters and/or other symbols.

The visual representation beneficially incorporates the musical data elements of the music track input feed as follows:

(i) a vertical position of a given lyrical data element of the music track relative to a horizontal axis of a display corresponds to a pitch of the music track at the given lyrical data element;

(ii) a horizontal position of the given lyrical data element corresponds to a tempo of the music track at the given lyrical data element;

(iii) a size of the given lyrical data element corresponds to a loudness of the music track at the given lyrical data element; and/or (iv) a font type and a colour of the given lyrical data element correspond to an articulation style of the music track at the given lyrical data element.

Thus, a higher baseline of a lyrical data element indicates a higher pitch of the lyrical data element. FIG. 3C shows baselines 302, 304, 306 and 308 of respective lyrical data elements.

In an embodiment of the present disclosure, the pitch of the music track is beneficially normalized before it is presented on the aforementioned visual representation. In order to normalize the pitch of the music track, the system 100 is optionally operable to identify a maximum pitch and a minimum pitch encountered within the music track. The maximum pitch and the minimum pitch are then normalized into a predefined pitch scale. Consequently, the maximum pitch is associated with a highest value on the predefined pitch scale, while the minimum pitch is associated with a lowest value on the predefined pitch scale. The predefined pitch scale may be either user-defined or system-defined by default. The predefined pitch scale may optionally be defined with respect to a screen size of the display.

With reference to FIG. 3C, the baselines 302, 304, 306 and 308 indicate that the pitch becomes higher as the music track proceeds. It is to be noted here that the baselines 302, 304, 306 and 308 have been shown for illustration purposes only. Such baselines may or may not be shown on the display.

Moreover, a horizontal spacing between the lyrical data elements indicates a rhythm of the lyrical data elements. The horizontal spacing varies with the rhythm, as shown in FIGS. 3B and 3C.

Moreover, a bigger font of a lyrical data element indicates a high loudness of the lyrical data element. In an embodiment, the loudness of the music track is beneficially normalized before it is presented on the aforementioned visual representation. In order to normalize the loudness of the music track, the system 100 is optionally operable to identify a maximum loudness and a minimum loudness encountered within the music track. The maximum loudness and the minimum loudness are then normalized into a predefined loudness scale. Consequently, the maximum loudness is associated with a highest value on the predefined loudness scale, while the minimum loudness is associated with a lowest value on the predefined loudness scale. The predefined loudness scale may be either user-defined or system-defined by default. The predefined loudness scale may optionally be defined with respect to a screen size of the display.

Moreover, a font type and a colour of a lyrical data element indicates an articulation style of the music track, such as whispering, shouting, falsetto, legato, staccato, and rap.

Moreover, other aspects of a background and/or a foreground of the visual representation, such as a colour, a texture, a border, a brightness and/or a contrast may also vary with dynamics of the music track. The other aspects may, for example, indicate a mood of the lyrical data element, for example, such as gloominess, happiness, old, young and so on.

Furthermore, the visual representation may also include animations and other visual effects, such as highlighting and glowing.

In this manner, the system 100 facilitates a single, holistic representation of the performance of the karaoke song.

FIGS. 3A, 3B and 3C are merely examples, which should not unduly limit the scope of the claims herein. A person skilled in the art will recognize many variations, alternatives, and modifications of embodiments of the present disclosure.

FIG. 4 is an example illustration of how a feedback can be provided to a user, in accordance with an embodiment of the present disclosure. With reference to FIG. 4, lyrical data elements of a music track of a karaoke song are depicted as foreground textual elements, while lyrical data elements of a performance of the karaoke song are depicted as background textual elements.

Optionally, a vertical position of a lyrical data element of the music track relative to a horizontal axis of the display corresponds to a pitch of the music track. Likewise, a vertical position of a lyrical data element of the performance relative to the horizontal axis of the display corresponds to a pitch of the performance.

Consequently, a difference between the pitch of the performance and the pitch of the music track is represented by a difference between a vertical position of a lyrical data element of the performance and a vertical position of a corresponding lyrical data element of the music track on the display. The difference between the pitch of the performance and the pitch of the music track is hereinafter referred to as "pitch difference".

In an embodiment, the vertical position of the lyrical data element of the performance is lower than the vertical position of the corresponding lyrical data element of the music track, when the pitch of the performance is lower than the pitch of the music track. On the other hand, the vertical position of the lyrical data element of the performance is higher than the vertical position of the corresponding lyrical data element of the music track, when the pitch of the performance is higher than the pitch of the music track.

With reference to FIG. 4, a vertical position of a lyrical data element 402 of the performance is higher than a vertical position of a corresponding lyrical data element 404 of the music track. This provides a feedback to the user that the pitch of the performance is higher than the pitch of the music track at the lyrical data element 402.

Likewise, a vertical position of a lyrical data element 406 of the performance is higher than a vertical position of a corresponding lyrical data element 408 of the music track. This provides the feedback to the user that the pitch of the performance is higher than the pitch of the music track at the lyrical data element 406.

Moreover, a difference between the vertical positions of the lyrical data element 406 and the corresponding lyrical data element 408 is greater than a difference between the vertical positions of the lyrical data element 402 and the corresponding lyrical data element 404. This beneficially indicates that the pitch difference is greater at the lyrical data element 406.

With reference to FIG. 4, a vertical position of a lyrical data element 410 of the performance is lower than a vertical position of a corresponding lyrical data element 412 of the music track. This provides a feedback to the user that the pitch of the performance is lower than the pitch of the music track at the lyrical data element 410.

Optionally, a difference between a tempo of the performance and a tempo of the music track is represented by a difference between a horizontal position of a lyrical data element of the performance on the display and a horizontal position of a corresponding lyrical data element of the music track on the display. The difference between the tempo of the performance and the tempo of the music track is hereinafter referred to as "tempo difference".

With reference to FIG. 4, a difference between a horizontal position of the lyrical data element 402 of the performance and a horizontal position of the corresponding lyrical data element 404 represents the tempo difference at the lyrical data element 402. The tempo difference at the lyrical data element 402 provides a feedback to the user that an error in a timing of the performance has occurred.

Optionally, a font type and a colour of a lyrical data element of the music track correspond to an articulation style of the music track. Likewise, a font type and a colour of a lyrical data element of the performance correspond to an articulation style of the performance.

Consequently, a difference between the articulation style of the performance and the articulation style of the music track is represented by a difference between the font type and the colour of a lyrical data element of the performance and the font type and the colour of a corresponding lyrical data element of the music track.

Moreover, a graphical indicator 414 is optionally moved horizontally across the display of the display device relative to the lyrical data elements of the music track. The graphical indicator 414 indicates a part of lyrics of the music track to be sung by the user. Thus, a speed of movement of the graphical indicator 414 is beneficially synchronized with the tempo of the music track.

With reference to FIG. 4, the graphical indicator 414 is circular in shape. It is to be noted here that the graphical indicator 414 is not limited to a particular shape, and could have any shape, for example, such as elliptical, star, square, rectangular, and so on.

In an alternative implementation, the graphical indicator 414 could be represented by changing a colour of the font of the lyrical data elements of the music track.

FIG. 4 is merely an example, which should not unduly limit the scope of the claims herein. A person skilled in the art will recognize many variations, alternatives, and modifications of embodiments of the present disclosure.

FIGS. 5A and 5B collectively are another example illustration of how a feedback can be provided to a user, in accordance with an embodiment of the present disclosure. With reference to FIGS. 5A and 5B, lyrical data elements of a music track of a karaoke song are depicted as background textual elements, while lyrical data elements of a performance of the karaoke song are depicted as foreground textual elements.

FIG. 5A shows a visual representation of the lyrical data elements of the music track before the user has sung these lyrical data elements.

FIG. 5B shows a visual representation of the lyrical data elements of the performance while the user performs the karaoke song.

In an embodiment of the present disclosure, the lyrical data elements of the performance are overlaid on corresponding lyrical data elements of the music track on the display, for example, as shown in FIG. 5B.

Optionally, a vertical difference in a position of the lyrical data elements of the performance overlaid on the corresponding lyrical data elements of the music track represents the pitch difference, as described earlier.

Optionally, a difference in a size of the lyrical data elements of the performance overlaid on the corresponding lyrical data elements of the music track represents a difference in a volume level.

In this regard, a size of a lyrical data element of the music track corresponds to a loudness of the music track. Likewise, a size of a lyrical data element of the performance corresponds to a loudness of the performance.

Consequently, a difference between the loudness of the performance and the loudness of the music track is represented by a difference between a size of a lyrical data element of the performance and a size of a corresponding lyrical data element of the music track on the display.

With reference to FIG. 5B, a size of a lyrical data element 502 of the performance is smaller than a size of a corresponding lyrical data element 504 of the music track. This provides a feedback to the user that the loudness of the performance is lower than the loudness of the music track at the lyrical data element 502.

FIGS. 5A and 5B are merely examples, which should not unduly limit the scope of the claims herein. A person skilled in the art will recognize many variations, alternatives, and modifications of embodiments of the present disclosure.

Figure 6A:
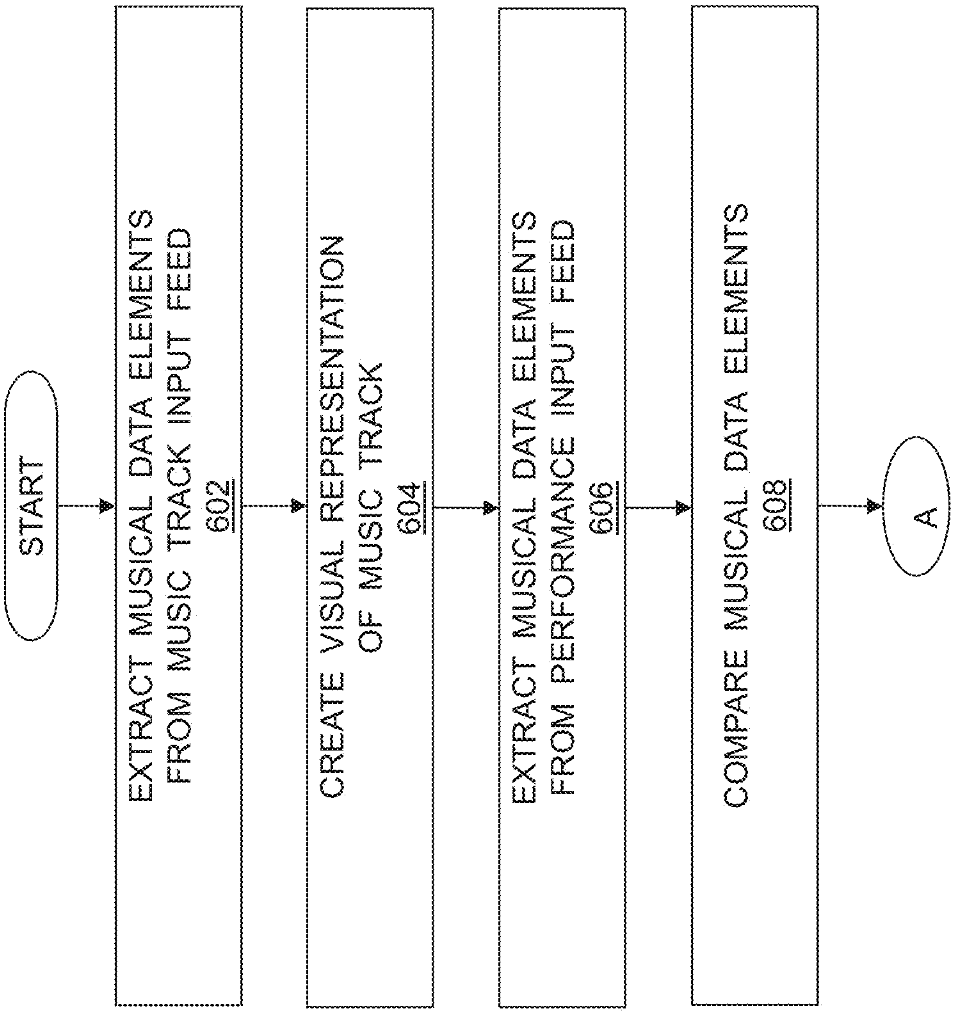
FIGS. 6A and 6B collectively are an illustration of steps of a method of providing a feedback on a performance of a karaoke song on a display device, in accordance with an embodiment of the present disclosure.
Figure 6B:
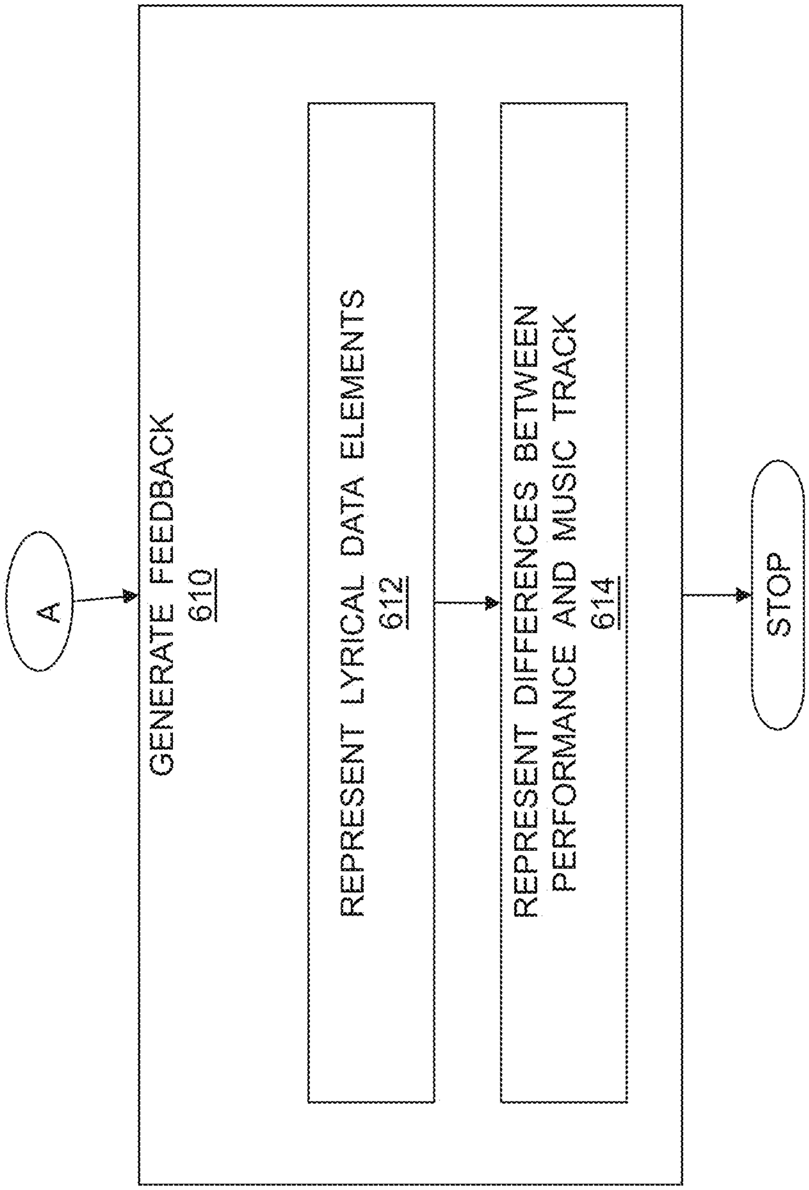

FIGS. 6A and 6B collectively are an illustration of steps of a method of providing a feedback on a performance of a karaoke song on a display device, in accordance with an embodiment of the present disclosure. The method is depicted as a collection of steps in a logical flow diagram, which represents a sequence of steps that can be implemented in hardware, software, or a combination thereof.

At a step 602, musical data elements are extracted from a music track input feed corresponding to a music track of the karaoke song. The step 602 may, for example, be performed by the server arrangement 102 as described earlier in conjunction with FIG. 1.

At a step 604, a visual representation of the music track of the karaoke song is created on a display of the display device. In accordance with the step 604, the visual representation is created at least partially based on the musical data elements extracted at the step 602, as described earlier.

At a step 606, musical data elements are extracted from a performance input feed corresponding to the performance of the karaoke song.

Subsequently, at a step 608, the musical data elements of the music track input feed are compared with the musical data elements of the performance input feed.

The steps 602, 606 and 608 are beneficially performed using signal processing algorithms.

At a step 610, the feedback is generated on the display of the display device, based at least partially on the comparison performed at the step 608. The step 610 includes steps 612 and 614.

At the step 612, lyrical data elements of the music track and lyrical data elements of the performance are represented on the display.

At the step 614, differences between the performance and the music track are represented by altering representations of their respective lyrical data elements relative to each other, as described earlier in conjunction with FIGS. 4, 5A and 5B.

It should be noted here that the steps 602 to 614 are only illustrative and other alternatives can also be provided where one or more steps are added, one or more steps are removed, or one or more steps are provided in a different sequence without departing from the scope of the claims herein.

Embodiments of the present disclosure provide a software product recorded on machine-readable non-transient data storage media, wherein the software product is executable upon computing hardware for implementing the method as described in conjunction with FIGS. 6A and 6B. The software product is optionally downloadable from a software application store, for example, from an "App store" to a display device, such as the display device 200.

Embodiments of the present disclosure are susceptible to being used for various purposes, including, though not limited to, providing a feedback on a performance of a karaoke song in substantially real-time; and facilitating a single, holistic representation of the performance of the karaoke song, thereby providing an enhanced karaoke experience to a user.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of providing feedback on a performance of a karaoke song on a display device, comprising:

extracting musical data elements from a music track input feed corresponding to a music track of the karaoke song, the extracted musical data elements of the music track input feed comprising one or more of: lyrical data elements, vocal data elements, instrumental data elements, and/or structural data elements;

creating a visual representation of the music track of the karaoke song on a display of the display device, the visual representation comprising a combination of two or more of: the lyrical data elements, the vocal data elements, the instrumental data elements, and/or the structural data elements;

extracting musical data elements from a performance input feed corresponding to the performance of the karaoke song, the musical data elements of the performance input feed comprising one or more of: lyrical data elements, vocal data elements, instrumental data elements, and/or structural data elements; and generating the feedback by comparing the musical data elements of the music track input feed to the musical data elements of the performance input feed, wherein generating the feedback comprises:

representing the lyrical data elements of the music track on the display of the display device;

representing the lyrical data elements of the performance on the display of the display device, wherein the lyrical data elements of the performance are positioned relative to corresponding lyrical data elements of the music track; and representing differences between the performance of the karaoke song and the music track of the karaoke song by altering a representation of the lyrical data elements of the performance relative to a representation of the lyrical data elements of the music track on the display of the display device.

2. The method of claim 1, wherein a vertical position of a lyrical data element of the music track relative to a horizontal axis of the display corresponds to a pitch of the music track, and a vertical position of a lyrical data element of the performance relative to the horizontal axis of the display corresponds to a pitch of the performance.

3. The method of claim 2, wherein a difference between the pitch of the performance and the pitch of the music track is represented by a difference between the vertical position of a lyrical data element of the performance on the display and the vertical position of a corresponding lyrical data element of the music track on the display.

4. The method of claim 3, wherein the vertical position of the lyrical data element of the performance is lower than the vertical position of the corresponding lyrical data element of the music track, when the pitch of the performance is lower than the pitch of the music track, and the vertical position of the lyrical data element of the performance is higher than the vertical position of the corresponding lyrical data element of the music track, when the pitch of the performance is higher than the pitch of the music track.

5. The method of claim 1, wherein a difference between a tempo of the performance and a tempo of the music track is represented by a difference between a horizontal position of a lyrical data element of the performance on the display and a horizontal position of a corresponding lyrical data element of the music track on the display.

6. The method of claim 1, wherein a size of a lyrical data element of the music track corresponds to a loudness of the music track, and a size of a lyrical data element of the performance corresponds to a loudness of the performance.

7. The method of claim 6, wherein a difference between the loudness of the performance and the loudness of the music track is represented by a difference between the size of a lyrical data element of the performance on the display and the size of a corresponding lyrical data element of the music track on the display.

8. The method of claim 1, comprising moving a graphical indicator horizontally across the display of the display device relative to the lyrical data elements of the music track, a speed of movement of the graphical indicator being synchronized with a tempo of the music track.

9. The method of claim 1, wherein the music track input feed comprises one or more of: audio data, musical data, song metadata, sensory data, video data, and/or contextual information.

10. The method of claim 1, wherein a font type and a color of a lyrical data element of the music track corresponds to an articulation style of the music track.

11. The method of claim 10, wherein a difference between an articulation style of the performance and the articulation style of the music track is represented by a difference between a font type and a color of a lyrical data element of the performance and the font type and the color of a corresponding lyrical data element of the music track.

12. The method of claim 1, wherein the lyrical data elements of the performance are overlaid on corresponding lyrical data elements of the music track on the display.

13. The method of claim 12, wherein a vertical difference in a position of the lyrical data elements of the performance overlaid on the corresponding lyrical data elements of the music track represents a pitch difference, and a difference in a size of the lyrical data elements of the performance overlaid on the corresponding lyrical data elements of the music track represents a difference in a volume level.

14. The method of claim 1, wherein the lyrical data elements of the music track and the lyrical data elements of the performance are textual elements.

15. A system, comprising: a memory; a processor coupled to the memory; and a display coupled to the processor, wherein the processor is configured to:

extract musical data elements from a music track input feed corresponding to a music track of a karaoke song, the musical data elements of the music track input feed comprising one or more of: lyrical data elements, vocal data elements, instrumental data elements, and/or structural data elements;

create a visual representation of the music track of the karaoke song on the display, the visual representation comprising a combination of two or more of: the lyrical data elements, the vocal data elements, the instrumental data elements, and/or the structural data elements;

extract musical data elements from a performance input feed corresponding to a performance of the karaoke song, the musical data elements of the performance input feed comprising one or more of: lyrical data elements, vocal data elements, instrumental data elements, and/or structural data elements; and generate a feedback by comparing the musical data elements of the music track input feed to the musical data elements of the performance input feed, wherein when generating the feedback, the processor is configured to:

represent the lyrical data elements of the music track on the display;

represent the lyrical data elements of the performance on the display, wherein the lyrical data elements of the performance are positioned relative to corresponding lyrical data elements of the music track; and represent differences between the performance of the karaoke song and the music track of the karaoke song by altering a representation of the lyrical data elements of the performance relative to a representation of the lyrical data elements of the music track on the display.

16. The system of claim 15, wherein a vertical position of a lyrical data element of the music track relative to a horizontal axis of the display corresponds to a pitch of the music track, and a vertical position of a lyrical data element of the performance relative to the horizontal axis of the display corresponds to a pitch of the performance.

17. The system of claim 16, wherein a difference between the pitch of the performance and the pitch of the music track is represented by a difference between the vertical position of a lyrical data element of the performance on the display and the vertical position of a corresponding lyrical data element of the music track on the display.

18. The system of claim 17, wherein the vertical position of the lyrical data element of the performance is lower than the vertical position of the corresponding lyrical data element of the music track, when the pitch of the performance is lower than the pitch of the music track, and the vertical position of the lyrical data element of the performance is higher than the vertical position of the corresponding lyrical data element of the music track, when the pitch of the performance is higher than the pitch of the music track.

19. The system of claim 15, wherein a difference between a tempo of the performance and a tempo of the music track is represented by a difference between a horizontal position of a lyrical data element of the performance on the display and a horizontal position of a corresponding lyrical data element of the music track on the display.

20. The system of claim 15, wherein a size of a lyrical data element of the music track corresponds to a loudness of the music track, and a size of a lyrical data element of the performance corresponds to a loudness of the performance.

21. The system of claim 20, wherein a difference between the loudness of the performance and the loudness of the music track is represented by a difference between the size of a lyrical data element of the performance on the display and the size of a corresponding lyrical data element of the music track on the display.

22. The system of claim 15, wherein the processor is configured to move a graphical indicator horizontally across the display relative to the lyrical data elements of the music track, a speed of movement of the graphical indicator being synchronized with a tempo of the music track.

23. The system of claim 15, wherein the music track input feed comprises one or more of: audio data, musical data, song metadata, sensory data, video data, and/or contextual information.

24. The system of claim 15, wherein a font type and a color of a lyrical data element of the music track correspond to an articulation style of the music track.

25. The system of claim 24, wherein a difference between an articulation style of the performance and the articulation style of the music track is represented by a difference between a font type and a color of a lyrical data element of the performance and the font type and the color of a corresponding lyrical data element of the music track.

26. The system of claim 15, wherein the lyrical data elements of the performance are overlaid on corresponding lyrical data elements of the music track on the display.

27. The system of claim 26, wherein a vertical difference in a position of the lyrical data elements of the performance overlaid on the corresponding lyrical data elements of the music track represents a pitch difference, and a difference in a size of the lyrical data elements of the performance overlaid on the corresponding lyrical data elements of the music track represents a difference in a volume level.

28. The system of claim 15, wherein the lyrical data elements of the music track and the lyrical data elements of the performance are textual elements.

29. A computer program product including computer readable code means recorded on machine-readable non-transient data storage media, the computer readable code means, when executed upon computing hardware being configured to implement the method as claimed in claim 1.

* * * * *